Sept. 19, 1967 P. E. RADEMACHER 3,343,167
OBJECT DETECTION SYSTEM
Filed Oct. 21, 1966 2 Sheets-Sheet 1

INVENTOR.
PAUL E. RADEMACHER
BY
*H.P. Jerry*
ATTORNEY

INVENTOR.
PAUL E. RADEMACHER
BY
ATTORNEY

United States Patent Office 3,343,167
Patented Sept. 19, 1967

3,343,167
OBJECT DETECTION SYSTEM
Paul E. Rademacher, Glen Head, N.Y., assignor to Sperry Rand Corporation, a corporation of Delaware
Filed Oct. 21, 1966, Ser. No. 588,632
10 Claims. (Cl. 343—17.5)

ABSTRACT OF THE DISCLOSURE

Object detection apparatus which directs modulated waves toward the object to be detected, receives reflections from the objects, and processes the reflections to selectively provide discrete signals indicative of object presence or motion which is automatically compensated for varying ambient conditions.

---

The present invention concerns the detection of the presence or passage of an object and it is particularly suitable for sensing the presence and/or motion of a vehicle.

In many metropolitan areas, the problem of vehicular traffic control has become formidable and has stimulated development of centralized computer controlled vehicular traffic control systems which determine and analyze current traffic conditions and provide signals to local traffic controlling devices to expedite traffic flow. The present invention is particularly suitable for operation in conjunction with the control system described in U.S. patent application S.N. 452,974, entitled "Traffic and Other Control Systems," invented by Guilianelli et al., and filed May 4, 1965.

The present invention utilizes the transmission of a high frequency sound directed toward the vehicles and senses the vehicles by detecting the echo signal returning therefrom to provide an indication of vehicle presence or motion. In an ultrasonic motor vehicle detector an appreciable amount of reflection in the form of clutter may be received from the road surface. The amount of clutter and the amount of motor vehicle return signal is variable due to atmospheric absorption of the sound wave which changes with temperature and humidity. In the absence of the present invention, this may cause either false indications or no indication when one is desirable. The present invention overcomes this problem by utilizing a floating threshold triggering device which operates on a fixed return signal to clutter ratio threshold basis.

Further, it is required that a malfunction in the transmit or receive portion of the system be detected by a continuous call from the threshold device. Thus, the threshold device should indicate that the clutter level has dropped below a predetermined level. An additional requirement is that a continuous call be produced if a vehicle stops while in the antenna beam.

It is therefore an object of the present invention to provide apparatus for accurately detecting the presence and/or passage of a moving object.

It is an additional object of the present invention to provide apparatus for detecting the presence and/or passage of an object which is automatically adjustable to compensate for varying ambient conditions.

It is a further object of the present invention to provide apparatus for detecting the presence and/or passage of a motor vehicle in which malfunction of the apparatus is automatically indicated.

It is an additional object of the present invention to provide apparatus for detecting the presence and/or passage of a motor vehicle in which a signal is provided in the event the vehicle remains continuously within the sensing beam.

The above objects are achieved by the present invention which directs ultrasonic waves toward the vehicles, receives reflections from the vehicles, and processes the reflections to selectively provide discrete signals indicative of vehicle presence or motion which is automatically compensated for varying ambient conditions. The presence signal may be a pulse having a duration depending upon the length of time that the vehicle is in the antenna beam while the motion signal may be pulses of a predetermined duration. A parked vehicle or a clutter voltage fall to zero may provide a continuous output call signal.

The above and other objects will become apparent by referring to the specification and drawings in which.

Although the present invention will be described with respect to sensing motor vehicles in conjunction with vehicular traffic control systems, it will be appreciated that it may also be utilized to detect the presence of any object capable of returning ultrasonic reflections such as boxes, cans, persons, freight cars, airplanes, etc. Therefore, in addition to functioning as a traffic control unit, it may also be used to operate gates, a counter, an alarm, or for any function in which presence or motion is the desired operating trigger.

Figure 1:
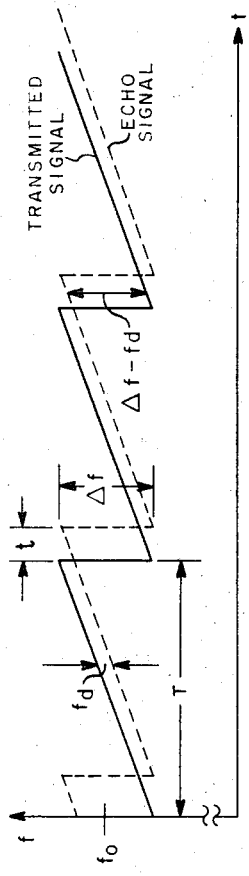
FIG. 1 is a graph showing frequency versus time for the transmitted signal and the echo signal.
Figure 2:
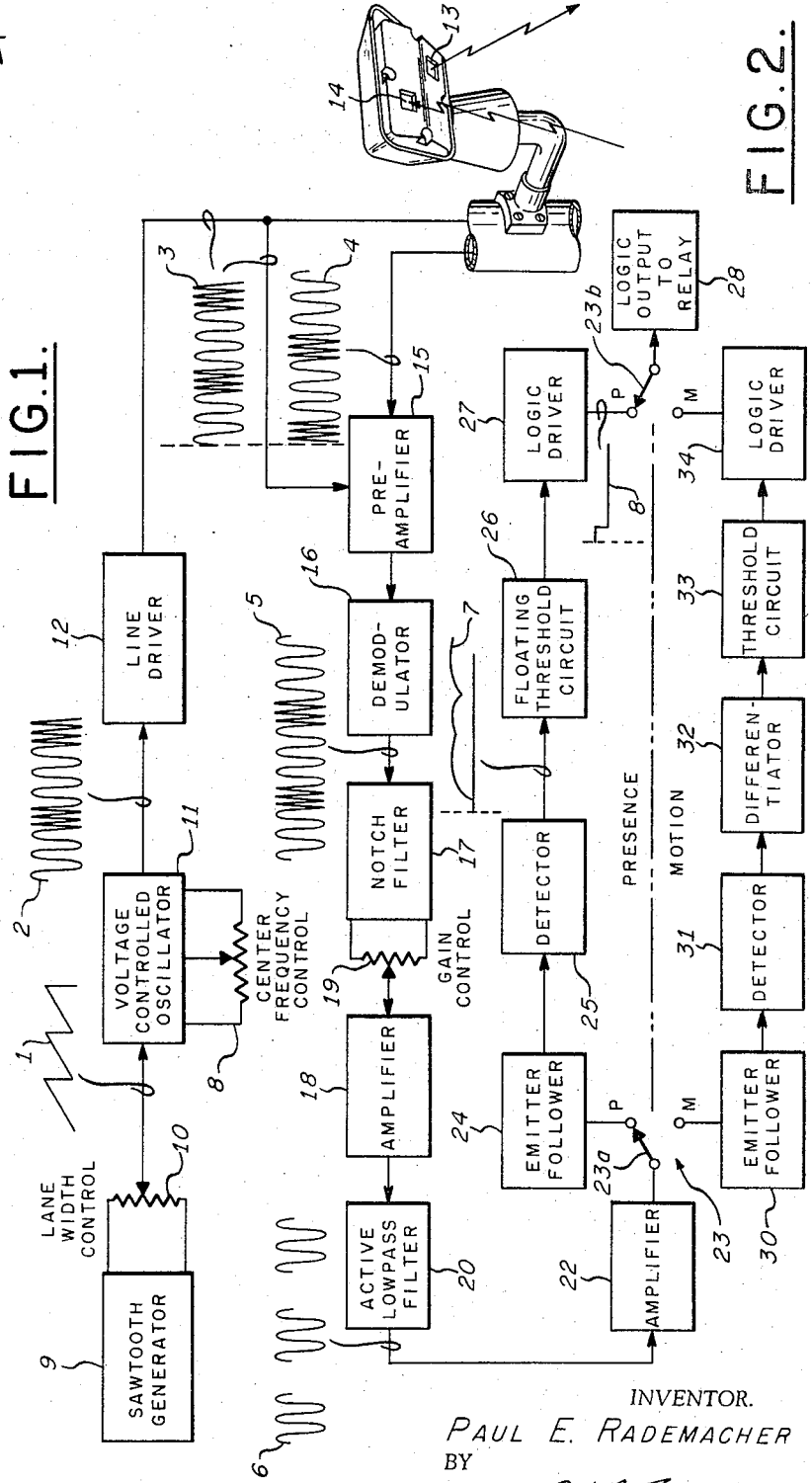
FIG. 2 is an electrical schematic diagram in block form of a presence and motion detector incorporating the present invention and also showing applicable waveforms.

The system of the present invention utilizes the transmission of high frequency sound, for example 40 kc., and senses the vehicles by detecting the echo signal therefrom. The transmission is continuous wave (CW) with a linearly swept frequency (sawtooth modulation). The repetition period of the sawtooth modulation is chosen to be appreciably longer than the anticipated round trip delay time to the target, as shown in the plot of FIG. 1 which represents frequency versus time for both the transmitted signal as well as the echo signal from a vehicle where referring to the graph of FIG. 1:

$T$ = modulation repetition period
$t$ = target roundtrip delay time
$\Delta f$ = depth of modulation
$f_0$ = transmitter center frequency Referring now to FIGS. 1 and 2, a sawtooth generator 9 generates a linear sawtooth sweep shown as an idealized waveform 1 which is coupled through an adjustable lane width potentiometer 10 and is used to modulate the output of a voltage controlled oscillator 11 thereby providing a frequency modulated output waveform 2. The frequency modulated output 2 has a sweep of 0.8 kc. to 4.8 kc. depending upon the amplitude of the sawtooth as set by the potentiometer 10 which is centered at 40 kc. by means of center frequency adjusting potentiometer 8. The 40 kc. FM output energizes a line driver 12 that in turn excites a transmitter transducer 13. At the transducer 13, the frequency modulated electrical wave 3 from the line driver 12 is converted to ultrasonic sound waves which are beamed towards the passing vehicles by the transmitting transducer 13. The ultrasonic waves are reflected by the passing vehicles and also the roadway. They are received by the receiving transducer 14 where they are converted back to an electrical signal. Since sound travels slower than electricity, there is a delay in the received signal 4 causing it to be a different frequency than the transmitted signal 3. The received target echo signal 4 is amplified and mixed with a sample of the transmitted frequency signal in a preamplifier and mixer 15. The resulting output from the preamplifier and mixer 15 is the sum and difference between the two input signals and consists of a higher frequency signal having a frequency approximately twice the transmitted signal and a lower frequency signal whose frequency is the difference between the received signal and the transmitted signal at any instant, thereby producing the difference frequencies $f_d$ and $(\Delta f - f_d)$. The difference frequency $f_d$ is seen to be equal to $t/T \Delta f$ which is thus linearly proportional to the vehicle range. If the antenna is mounted at the side of the road, the difference frequency associated with the vehicle echo will thus be dependent on the lane in which the vehicle is located, the lower frequency being due to vehicles in the nearer lane. The detection range is adjusted by varying the peak voltage of the sawtooth wave 1 by means of the potentiometer 10 which, in turn, varies the sweep range.

After demodulation in the demodulator 16, the difference frequency signal 5 is passed through a lowpass filter consisting of a notch filter 17, an amplifier 18 and an active lowpass filter 20 having a cutoff frequency $f_c$, thus any difference frequency greater than $f_c$ will be discriminated against at the filter output. The cutoff range will correspond to the difference frequency $f_d = f_c$. Thus $$\frac{t_{max.}}{T} \Delta f = f_c$$

$$t_{max.} = f_c \times \frac{T}{\Delta f} = \frac{2 R_{max.}}{v}$$

where $R_{max.}$ = the maximum demodulation range (cutoff range)
$v$ = speed of sound in air $$R_{max.} = \frac{f_c T v}{2 \Delta f}$$

For the present invention $f_c$, T and $v$ are constants. Thus, $$R_{max.} = \frac{K}{\Delta f}$$

and the cutoff range is electrically adjustable by adjusting the depth of modulation $\Delta f$.

It will be noted that the second difference frequency $\Delta f - f_d$ is always high and will not pass the lowpass filter 17 which results in discontinuities in the spring appearing at the filter output. However, these are of short enough duration that they do not degrade system performance.

The signal from the notch filter 17 is coupled via a gain potentiometer 19 to the amplifier 18 and then applied to the active lowpass filter 20. The high frequency cutoff of the lowpass filter 20 is 480 cycles, for example, while the low frequency fall off begins at approximately 150 cycles, for example. Thus, the filter 20 blocks the higher frequencies caused by the delay in the received signal and the lower frequencies caused by direct coupling between the transmitting and receiving transducers 13 and 14, respectively. The output signal of the filter 20 is amplified in an amplifier 22 and then applied to a switch 23. With the ganged contact arms of the switch 23a and 23b abutting against the upper respective contacts P, an output signal is provided indicating the presence of a vehicle. With the switch 23 in the upper position as shown in FIG. 2, the amplified output of the amplifier 22 is connected through a matching emitter follower 24 to a detector 25. The discharging time constant of the detector 25 is long with respect to the charging time constant in order to prevent loss of detector output during the discontinuities between the low frequency pulses shown in waveform 6 of FIG. 2. The detector output as shown in waveform 7 is then applied to a floating threshold circuit 26, which will be explained in greater detail subsequently. If the predetermined threshold is reached, the output signal from the threshold circuit 26 actuates a logic driver 27 to provide a signal 8 which in turn actuates a relay 28 via contact arm 23b of the switch 23 thereby providing an indication that a car has been detected.

For motion detection, the ganged contact arms 23a and 23b of the switch 23 are placed in their lower position as viewed in FIG. 2 abutting the respective contacts M. In this position of the switch 23, the output of the amplifier 22 is connected through a matching emitter follower 30 to a detector 31. The output of the detector 31 is differentiated in an R-C type of differentiator 32 and is then connected to a threshold circuit 33 which in turn operates a logic driver 34 when the threshold is exceeded to actuate the output relay 28 thereby indicating vehicle motion.

In an ultrasonic vehicle detector of the character explained above, an appreciable amount of reflection in the form of clutter is received from the road surface. The amount of clutter and vehicle returns is variable due to atmospheric absorption of the sound wave which changes with temperature and humidity. If a fixed, threshold device is used to detect vehicle presence, the detection probability and false alarm rate can vary with temperature and humidity. In one case, high clutter will cause false alarms and in the other case low clutter and correspondingly small vehicle returns can reduce the detection probability. Since atmospheric absorption affects both clutter and signal returns equally, the signal to clutter ratio $(S/C)$ remains essentially constant. Thus, for reliable operation, a threshold device is required which operates on a fixed $(S/C)$ threshold basis.

In addition, it is required that a fault in the transmit or receive system be detected by a continuous call from the threshold device. Such a fault would result in a sharp decrease in the normal clutter level, probably to zero. Thus, the threshold device must fire if the clutter level drops below a certain level. An additional requirement is that if a vehicle stops in the antenna beam, a continuous call must be produced. Thus, for large signal inputs, the threshold device must provide a continuous call. Summarizing the threshold circuit requirements:

(1) Threshold criteria—fixed $S/C$ ratio
(2) Continuous call on low clutter
(3) Continuous call on high signal Since both the signal and clutter are amplitude detected prior to the threshold circuit, the only information present to the threshold is a voltage. The signal is differentiated from the clutter by a sharp rise in this voltage. Thus, the three operating criteria above can be restated as follows:

(1) Threshold criteria $$\frac{V_{final}}{V_{initial}} = K$$

(for sharp rise in V)
(2) Continuous call for V very small
(3) Continuous call for V very large A floating threshold circuit 26 suitable for use with the present invention will now be described with respect to FIG. 3 which achieves the above criteria.

The voltage $V_{in}$ is equivalent to the output signal of the detector 25, shown in FIG. 2 and is passed through a transistor 38 which functions as an emitter follower. The voltage $V_T$ is the threshold control voltage and is derived by integrating $V_{in}$ in a long time constant R-C circuit containing a resistor 40 and a capacitor 41. The time constant of this circuit is 10 seconds, for example. The voltage $V_1$ is the input voltage $V_{in}$ reduced by the resistive divider 39 consisting of the resistors 42 and 43 plus an additive voltage supplied through the Zener diode 44. The magnitude of this latter component is dependent on the amount of current passing through the transistor 45.

In operation, under normal clutter conditions, $V_{in}$ is some nominal value, for example 4 average, and therefore $V_T$ is also 4. The collector of the transistor 45 is thus approximately at ground potential and no voltage is added to $V_1$ through the Zener diode 44. The voltage $V_1$ is therefore the fractional portion of $V_{in}$ as determined by the resistive divider 39. Since $V_1 < V_T$, the transistor 46 is full off and thus the collector of the transistor 47 is at +12.

If $V_{in}$ should suddenly increase which is indicative of a vehicle signal present, $V_1$ will increase above $V_T$ (which is initially held constant by the 10 second time constant) if the percentage increase in $V_{in}$ is greater than $$\left(\frac{1}{K}-1\right)$$

where $K$=the resistive divider division ratio. When this occurs, the transistor 45 is turned off, with its collector rising to +12 v. This action causes an additional 1 volt to be added to $V_1$ through the Zener diode 44. This feedback assures both hard turn off of the transistor 45 and adds a hysteresis to the switching action. With the transistor 46 in conduction, the transistor 47 is turned on and its collector is essentially at ground potential. This latter action is indicative that a detection has been made.

When the vehicle leaves the beam, $V_1$ will rapidly fall to its initial value and the transistor 45 will turn on. This switching is now aided by the removal of the 1 volt from $V_1$ which was supplied through the Zener diode 46. Thus, the circuit has a hysteresis associated with it. The detection criteria is seen to be the requirement of a percentage increase in $V_{in}$. This is analogous to a percentage increase in the signal with respect to the normal clutter as required by criteria (1).

When $V_{in}$ is very small, $V_T$ is very small and thus the collector of the transistor 45 will rise towards +12 v. This then causes a voltage to be added to $V_1$. It can be shown that when $V_T$ decreases to about 1.6 v., this added voltage will suffice to turn the transistor 46 on and thus turn the transistor 45 off. This causes the collector of the transistor 47 to fall to ground potential thus providing a continuous detection. Thus criteria (2) is fulfilled.

If a vehicle stops in the antenna beam, the normal detection will initially take place, but then $V_T$ will slowly rise towards $V_{in}$ with a 10 second time constant. If this rise were left unchecked, $V_T$ would eventually exceed $V_1$ and the detection would be lost. To counter this, a collector resistor 48 is placed in the collector of a transistor 50 so that it will saturate $V_T$=4.4 v. Thus, $V_T$ is not permitted to rise appreciably above this value and thus the detection is held indefinitely. This satisfies criteria (3). Typical component designations and component values are indicated in FIG. 3 with respect to a typical circuit.

Figure 3:
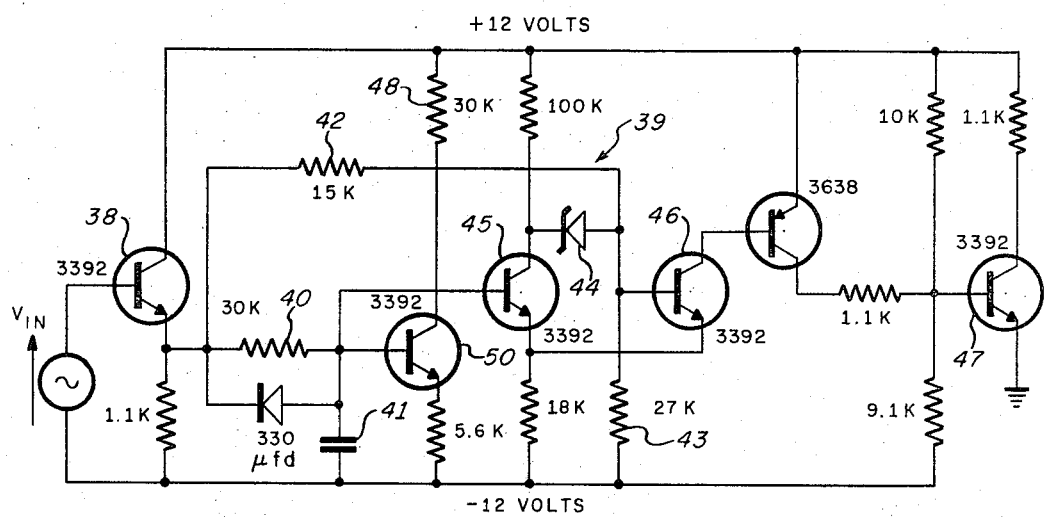
FIG. 3 is an electrical schematic wiring diagram of a floating threshold circuit shown in FIG. 2.
Figure 4:
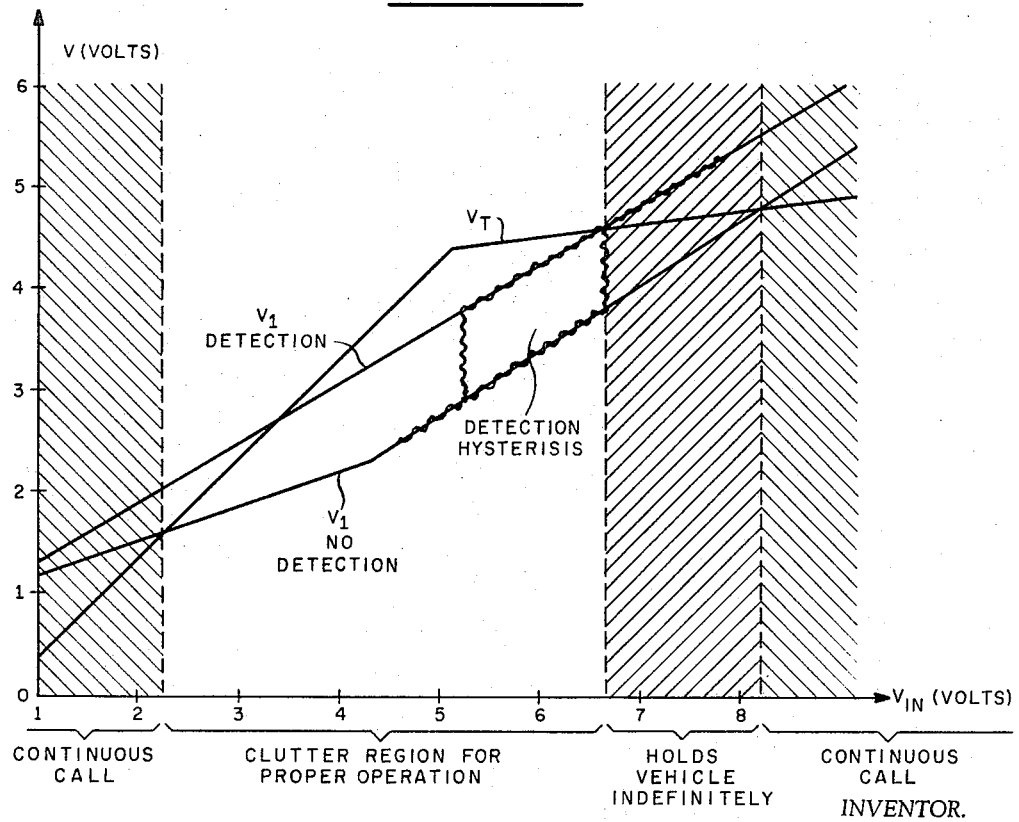
FIG. 4 is a graph showing the voltage excursions occurring in the circuit of FIG. 3.

A graph showing the critical voltage excursions with respect to the threshold circuit of FIG. 3 is shown in FIG. 4. The regions of continuous detection are shown along with a representative hysteresis loop.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. In object detection apparatus,
 (a) means for generating a frequency modulated wave having a predetermined range of frequency modulation,
 (b) transmitting means for transmitting said wave toward a reflecting object,
 (c) receiving means for receiving the reflected wave,
 (d) means for combining said transmitted and reflected waves for providing a resultant signal having a high frequency portion whose frequency is approximately twice that of said transmitted wave and a low frequency portion whose frequency is the difference between that of said transmitted and said received signal at any instant,
 (e) lowpass filtering means responsive to said resultant signal for providing a discontinuous filtered signal which eliminates said high frequency portion caused by delay in said received signal and lower frequencies caused by direct coupling between said transmitting and receiving means,
 (f) detecting means responsive to said discontinuous filtered signal having a time constant that is sufficiently long to provide a continuous filtered signal, and
 (g) threshold circuit means responsive to said continuous filtered signal for providing an output signal when the threshold is exceeded.

2. In object detection apparatus of the character recited in claim 1 and further including means responsive to said output signal for providing a measure representative of the presence of said object.

3. In object detection apparatus for the character recited in claim 1 and further including means including differentiating means responsive to said filtered signal for providing a measure representing motion of said object.

4. In object detection apparatus of the character recited in claim 1 and further including means responsive to said output signal for providing a measure representative of the presence of said object, means including differentiating means responsive to said filtered signal for providing a measure representing motion of said object, and means for selectively rendering said last-mentioned means or said penultimate mentioned means effective for providing a measure representing motion or presence respectively of said object.

5. In object detection apparatus of the character recited in claim 1 in which said object is a vehicle, and said threshold circuit means includes compensating means for compensating for the effects of the variation of the clutter and vehicle return signals due to atmospheric absorption to provide a substantially constant vehicle return to clutter ratio.

6. In object detection apparatus of the character recited in claim 1 in which said object is a vehicle, and said threshold circuit means includes means for providing a constant output signal when the clutter signal level drops below a certain level.

7. In object detection apparatus of the character recited in claim 1 in which said object is a vehicle, and said threshold circuit includes means for providing a constant output signal when a vehicle stalls thereby continuously reflecting said reflected wave.

8. In a floating threshold circuit,
 (a) integrating means having a predetermined time constant adapted to be responsive to an input signal for providing an integrated signal thereof,
 (b) voltage dividing means responsive to said input signal for providing a first signal as a function of the division ratio,
 (c) first transistor means responsive to said integrated signal,
 (d) second transistor means responsive to said first signal and coupled to control said first transistor means when the percentage increase in said input signal is greater than said division ratio thereby providing an output signal.

9. In a circuit of the character recited in claim 8 and further including Zener diode means coupled between said voltage dividing means and said first transistor means for providing a feedback signal to assure turn off of said first transistor means and to provide a hysteresis effect.

10. In a circuit of the character recited in claim 8 and further including signal limiting means responsive to said integrated signal for limiting said integrated signal to a predetermined value less than that of said input signal for providing a continuous call signal when said input signal is continuous.

No references cited.

RODNEY D. BENNETT, *Primary Examiner.*
C. L. WHITHAM, *Assistant Examiner.*